United States Patent
Chapman

(10) Patent No.: US 10,771,378 B2
(45) Date of Patent: Sep. 8, 2020

(54) RADIO FREQUENCY (RF) ETHERNET TRUNKING

(71) Applicant: Cisco Technology, Inc., San Jose, CA (US)

(72) Inventor: John T. Chapman, Coto de Caza, CA (US)

(73) Assignee: Cisco Technology, Inc., San Jose, CA (US)

( * ) Notice: Subject to any disclaimer, the term of this patent is extended or adjusted under 35 U.S.C. 154(b) by 59 days.

(21) Appl. No.: 16/037,718

(22) Filed: Jul. 17, 2018

(65) Prior Publication Data

US 2019/0020577 A1    Jan. 17, 2019

Related U.S. Application Data

(60) Provisional application No. 62/533,194, filed on Jul. 17, 2017.

(51) Int. Cl.
| | |
|---|---|
| *H04W 52/00* | (2009.01) |
| *H04L 12/709* | (2013.01) |
| *H04L 29/08* | (2006.01) |
| *H04B 10/2575* | (2013.01) |
| *H04L 5/14* | (2006.01) |
| *H04Q 11/00* | (2006.01) |

(Continued)

(52) U.S. Cl.
CPC ....... *H04L 45/245* (2013.01); *H04B 10/2575* (2013.01); *H04L 5/14* (2013.01); *H04L 69/18* (2013.01); *H04L 69/326* (2013.01); *H04Q 11/0067* (2013.01); *H04L 49/602* (2013.01)

(58) Field of Classification Search
CPC ......... H04L 45/245; H04L 5/14; H04L 69/18; H04L 69/326; H04L 49/602; H04B 10/2575; H04O 11/0067

USPC ........................................................ 370/276
See application file for complete search history.

(56) References Cited

U.S. PATENT DOCUMENTS

| | | | | |
|---|---|---|---|---|
| 2002/0033416 A1* | 3/2002 | Gerszberg | ........... | H04M 19/001 235/380 |
| 2014/0199080 A1* | 7/2014 | Ramesh | ................. | H04B 10/40 398/116 |
| 2017/0237492 A1* | 8/2017 | Mutalik | ............. | H04B 10/2503 398/72 |

FOREIGN PATENT DOCUMENTS

EP    2744199 A1    6/2014

OTHER PUBLICATIONS

International Search Report and Written Opinion issued in application PCT/US2018/042491, dated Oct. 9, 2018, (19 pgs.).

(Continued)

*Primary Examiner* — Sai Ming Chan
(74) *Attorney, Agent, or Firm* — Merchant & Gould P.C.

(57) ABSTRACT

Radio Frequency (RF) Ethernet trunking may be provided. A networking system may comprise a first data pathway, a second data pathway, and a third data pathway. The first data pathway may be between a headend and a first node and may comprise a fiber optic channel using a first data transport protocol. The second data pathway may be between the first node and a second node and may comprise a first coaxial cable channel using the first data transport protocol over a first radio frequency spectrum. The third data pathway may be between the second node and a third node and may comprise a second coaxial cable channel using the first data transport protocol over the first radio frequency spectrum. The second data pathway and the third data pathway may comprise a data trunk using the first data transport protocol for data to and from the first node.

20 Claims, 4 Drawing Sheets

(51) Int. Cl.
    *H04L 29/06*     (2006.01)
    *H04L 12/931*    (2013.01)

(56) References Cited

OTHER PUBLICATIONS

Cisco: "Cisco Coaxial Media Converter for Remote-PHY", Aug. 20, 2014 (Aug. 20, 2014), XP055511419, Retrieved from the Internet: URL:https://www.cisco.com/c/en/us/products/collateral/video/16x4-coaxial-media-converter/datasheet-c78-732043.html retrieved on Oct. 1, 2018.

* cited by examiner

RADIO FREQUENCY (RF) ETHERNET TRUNKING

RELATED APPLICATION

Under provisions of 35 U.S.C. § 119(e), Applicants claim the benefit of U.S. Provisional Application No. 62/533,194 filed Jul. 17, 2017, which is incorporated herein by reference.

TECHNICAL FIELD

The present disclosure relates generally to downstream node deployment.

BACKGROUND

A Hybrid Fiber-Coaxial (HFC) network is a broadband network that combines optical fiber and coaxial cable. It has been commonly employed globally by cable television operators. In a hybrid fiber-coaxial cable network, television channels are sent from a cable system's distribution facility to local communities through optical fiber trunk lines. At the local community, a box translates the signal from a light beam to electrical signal, and sends it over cable lines for distribution to subscriber residences. The optical fiber trunk lines provide adequate bandwidth to allow future expansion and new bandwidth-intensive services.

BRIEF DESCRIPTION OF THE FIGURES

The accompanying drawings, which are incorporated herein and constitute a part of this disclosure, illustrate various embodiments of the present disclosure. In the drawings.

DETAILED DESCRIPTION

Overview

Figure 1:
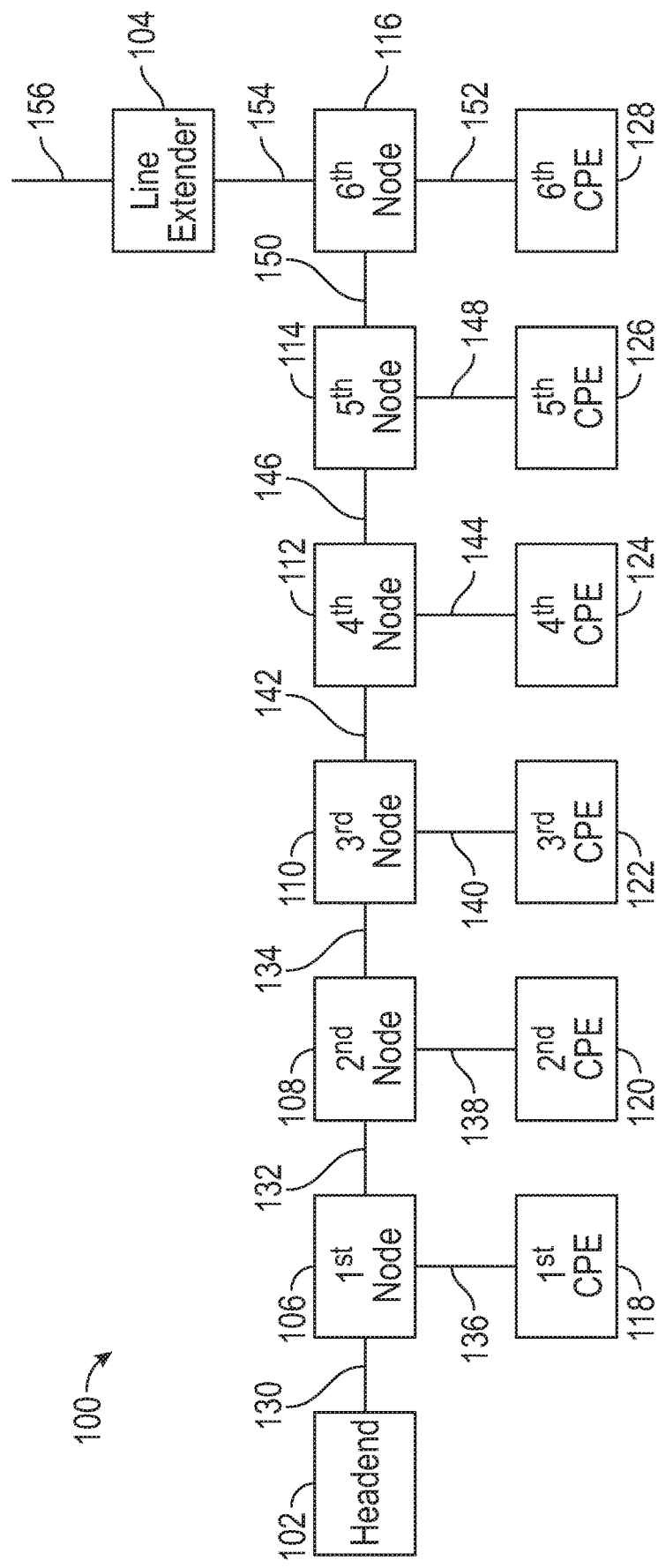
FIG. 1 is a block diagram of a networking system.

Radio Frequency (RF) Ethernet trunking may be provided. A networking system may comprise a first data pathway, a second data pathway, and a third data pathway. The first data pathway may be between a headend and a first node and may comprise a fiber optic channel using a first data transport protocol. The second data pathway may be between the first node and a second node and may comprise a first coaxial cable channel using the first data transport protocol over a first radio frequency spectrum. The third data pathway may be between the second node and a third node and may comprise a second coaxial cable channel using the first data transport protocol over the first radio frequency spectrum. The second data pathway and the third data pathway may comprise a data trunk using the first data transport protocol for data to and from the first node.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Multiple-system operators (MSOs) may comprise operators of multiple cable or direct-broadcast satellite television systems that provide content from a headend. The headend may comprise, but is not limited to, a cable television headend that may comprise a master facility for receiving television signals for processing and distribution over a cable television system. Fiber deep (FD) may comprise a trend in which MSOs push fiber ever closer to customers to provide them with better service. In order to provide FD, many Data Over Cable Service Interface Specification (DOCSIS) compliant Hybrid Fiber-Coaxial (HFC) devices may be deployed onto an FD HFC network. These deployed devices may comprise, for example, Full Duplex (FDX) Remote PHY (RPD) nodes and FDX amplifiers. FDX RPD nodes and FDX amplifiers may amplify bi-directional full duplex traffic on the HFC that may share frequency spectrum in both an upstream (US) direction and a downstream (DS) direction on the HFC. Non FDX RPD nodes and Non FDX amplifiers may not share frequency spectrum.

FDX amplifiers may utilize coaxial cables on both a US side and a DS side. As opposed to FDX amplifiers, FDX RPD nodes may send and receive signals from an MSO headend via fiber optic cable on the US side rather than via coaxial cable, but may use coaxial cables on the DS side. Accordingly, FDX RPD nodes may be located at a junction of a fiber plant and a coaxial plant in the HFC network. Furthermore, FDX RPD nodes may include remote PHY circuitry that may implement the physical layer functionality that was conventionally perform at a Cable Modem Termination System (CMTS) located at the headend operated by the MSO.

MSOs may wish to upgrade their HFCs to adopt FD. In addition, the MSOs may wish to upgrade their HFCs to operate in FDX (e.g., DOCSIS compliant FDX), for example, to resolve DOCSIS US throughput shortfalls. However, upgrading to FD may be a costly process making this option less attractive. Embodiments of the disclosure may allow a similar performance of FD without running new fiber by using a Radio Frequency (RF) Ethernet overlay. With embodiments of the disclosure, a performance similar to FD may be obtained by making an equipment swap on nodes and amplifiers in the HFC. This may also allow FDX to be deployed.

FIG. 1 is a block diagram of a networking system 100. As shown in FIG. 1, networking system 100 may comprise a headend 102, a plurality of nodes, a plurality of Customer Premises Equipment (CPE), a plurality of data pathways, and a line extender 104. The plurality of nodes may comprise a first node 106, a second node 108, a third node 110, a fourth node 112, a fifth node 114, and a sixth node 116. Each of the plurality of nodes may comprise a trunking node 300 as described in greater detail below with respect to FIG. 3 and FIG. 4.

The plurality of CPE may comprise a first CPE 118, a second CPE 120, a third CPE 122, a fourth CPE 124, a fifth CPE 126, and a sixth CPE 128. For example, each of the plurality of CPE may comprise, but is not limited to, any terminal and associated equipment located at a subscriber's premises and connected with an MSO's telecommunication channel at a demarcation point. The aforementioned customer premises equipment may comprise, but are not limited to, a cellular base station, a tablet device, a mobile device, a smart phone, a telephone, a remote control device, a set-top box, a digital video recorder, a cable modem, a personal computer, a network computer, a mainframe, a router, or other similar microcomputer-based device.

The plurality of data pathways may comprise a first data pathway 130, a second data pathway 132, a third data pathway 134, a fourth data pathway 136, a sixth data pathway 138, a seventh data pathway 140, an eighth data pathway 142, a ninth data pathway 144, a tenth data pathway 146, an eleventh data pathway 148, a twelfth data pathway 150, a thirteenth data pathway 152, a fourteenth data pathway 154, and a fifteenth data pathway 156.

Embodiments of the disclosure may use a first data transport protocol and a second data transport protocol. The first data transport protocol, for example, may comprise, but is not limited to, Ethernet. The first data transport protocol may run over a first radio frequency spectrum that may be used in a Full Duplex (FDX) mode. The first radio frequency spectrum may comprise, but is not limited to, greater than 1.5 GHz. The second data transport protocol, for example, may comprise, but is not limited to, DOCSIS. The second data transport protocol may run over a second radio frequency spectrum that may be used in a FDX mode. The second radio frequency spectrum may comprise, but is not limited to, less than 1.2 GHz. The first radio frequency spectrum may be higher than the second radio frequency spectrum.

First data pathway 130 may comprise a fiber optic channel (e.g., a fiber optic cable) using the first data transport protocol via Wavelength-Division Multiplexing (WDM). Subsequent hops comprising second data pathway 132, third data pathway 134, eighth data pathway 142, tenth data pathway 146, and twelfth data pathway 150 (i.e., between second node 108, third node 110, fourth node 112, fifth node 114, and sixth node 116) may comprise coaxial cable channels using the first data transport protocol over the first radio frequency spectrum.

Fourth data pathway 136, sixth data pathway 138, seventh data pathway 140, ninth data pathway 144, eleventh data pathway 148, and thirteenth data pathway 152 may comprise coaxial cable channels between respective nodes and CPE using the second data transport protocol over the second radio frequency spectrum. While FIG. 1 shows one CPE connected to a node, any number of CPE may be connected to a node and embodiments of the disclosure are not limited to one. Accordingly, system 100 may provide a plurality of separate domains (e.g., DOCSIS domains when DOCSIS is used as the second data transport protocol). For example, first node 106 and first CPE 118 may comprise a first domain, second node 108 and second CPE 120 may comprise a second domain, third node 110 and third CPE 122 may comprise a third domain, fourth node 112 and fourth CPE 124 may comprise a fourth domain, fifth node 114 and fifth CPE 126 may comprise a fifth domain, and sixth node 116 and sixth CPE 128 may comprise a sixth domain.

Furthermore, while not shown, additional nodes (e.g., amplifiers) may be cascaded in series off of the plurality of nodes in FIG. 1 on ports of the second data transport protocol side of the plurality of nodes. These additional nodes may be in place of or in addition to the respective CPE on the plurality of nodes.

As shown in FIG. 1, consistent with embodiments of the disclosure, second data pathway 132, third data pathway 134, eighth data pathway 142, tenth data pathway 146, and twelfth data pathway 150 may comprise a data trunk using the first data transport protocol for data to and from first node 106 and the rest of the nodes (e.g., second node 108, third node 110, fourth node 112, fifth node 114, and sixth node 116). As such, the second data transport protocol (e.g., DOCSIS/Video) does not propagate across the plurality of nodes. Instead, the second data transport protocol (e.g. radio frequency Ethernet) may be propagated peer-to-peer (P2P) between nodes.

Line extender 104 may comprise an FDX line extender (FLE). Line extender 104 may be a lower cost assembly than trunking node 300 and may propagate the aforementioned second radio frequency spectrum (e.g., in FDX). Unlike trunking node 300 as described in greater detail below with respect to FIG. 3 and FIG. 4, line extender 104 may not contain a first data transport protocol switch (e.g., Ethernet switch) or a Remote PHY device (RPD). Line extender 104 may contain software and Digital Signal Processing (DSP) circuitry, may be Internet Protocol (IP) addressable, and fully networked. Alternatively, line extender 104 could be replaced with a first data transport protocol (e.g., Radio Frequency (RF) Ethernet) line extender that contains an RPD.

Figure 2:
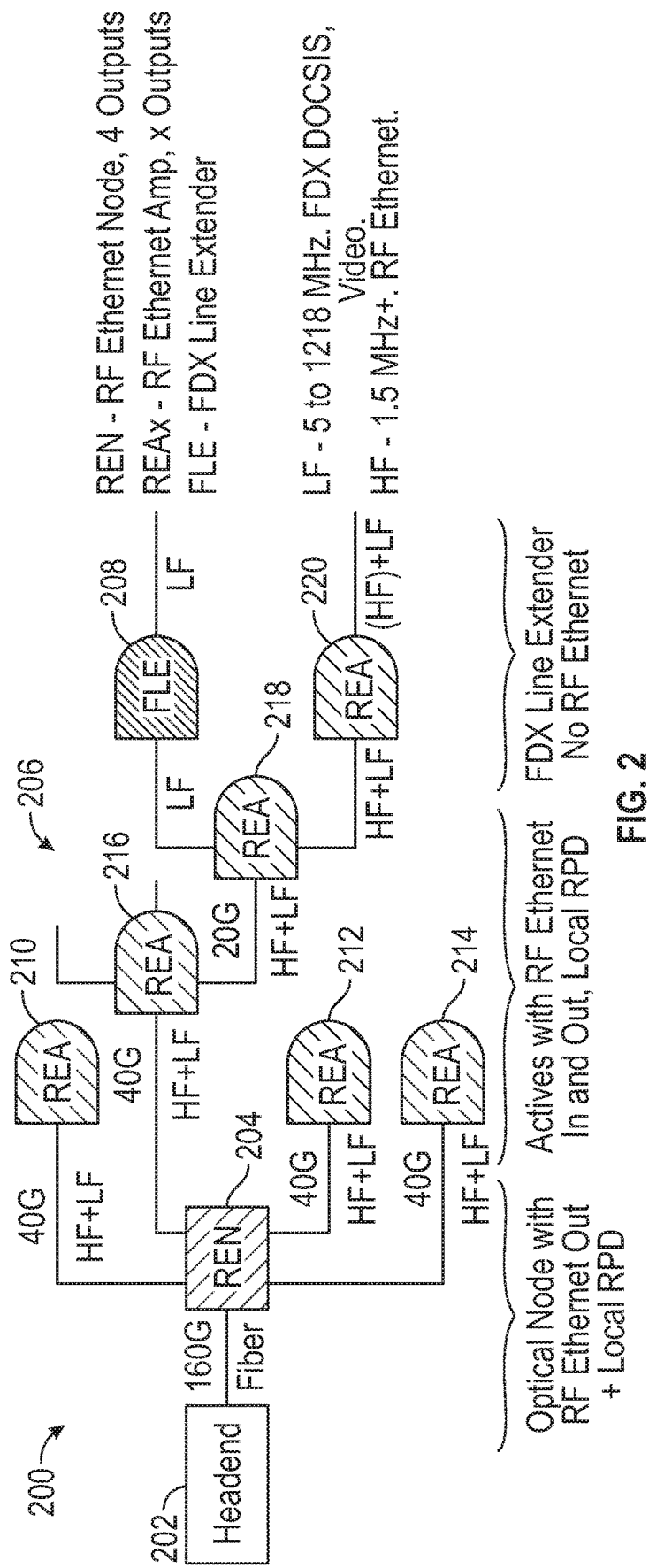
FIG. 2 is a block diagram of a networking system illustrating a use case where a first data transport protocol and a second data transport protocol may comprise Ethernet and DOCSIS respectively.

FIG. 2 is a block diagram of a networking system 200 illustrating a use case where the aforementioned first data transport protocol and second data transport protocol may comprise Ethernet and DOCSIS respectively. As shown in FIG. 2, networking system 200 may comprise, a headend 202, an RF Ethernet Node (REN) 204, a plurality of RF Ethernet Amplifiers (REAs) 206, and an FLE 208. Plurality of REAs 206 may comprise a first REA 210, a second REA 212, a third REA 214, fourth REA 216, a fifth REA 218, and a sixth REA 220. REN 204 and plurality of RF Ethernet Amplifiers (REAs) 206 may comprise trunking node 300 as described in greater detail below with respect to FIG. 3 and FIG. 4. FLE 208 may comprise line extender 104 as described above. Headend 202 may connect to REN 204 via a fiber optic link. The remaining links in FIG. 2 may comprise coaxial cable links.

Optical Ethernet may operate on the fiber link between headend 202 and REN 204. RF Ethernet may operate on the remaining coaxial cable links. Optical Ethernet and RF Ethernet may act as an overlay that feeds each local RPD in the plurality of REAs 206. Active devices (e.g., plurality of REAs 206) may comprise, for example, amplifier upgrades or fiber deep nodes with an RF Ethernet input. Bandwidth examples may comprise, but are not limited to, 160 Gbps into REN 204, and then 40 Gbps to the next level (e.g., first REA 210, second REA 212, third REA 214 amp, and fourth REA 216) and then less after that in system 200. As shown in FIG. 2, Low Frequency (LF) may comprise, but is not limited to, 5 MHz to 1218 MHz DOCSIS (e.g., second data transport protocol). High Frequency (HF) may comprise, but is not limited to, 1.5 MHz+RF Ethernet (e.g., first data transport protocol).

In deployment scenarios consistent with embodiments of the disclosure, an RF Ethernet overlay may be used instead of running new fiber. Accordingly, this may provide, for example, an N+0 FDX equivalent plant instead of N+5 42, 85, or 204 MHz plant. One scenario may comprise an equipment only upgrade where nodes and amplifier may be upgraded and interconnect with RF Ethernet. Another scenario may comprise redeploying fiber deep nodes (e.g., so less actives and at different locations), but connect them back to a parent node with RF Ethernet. Yet another scenario may comprise partially deploying fiber, for example, in an overhead part of the plant (i.e. HFC) down to N+3, and the remainder of the plant, which may be underground, with RF Ethernet.

Figure 3:
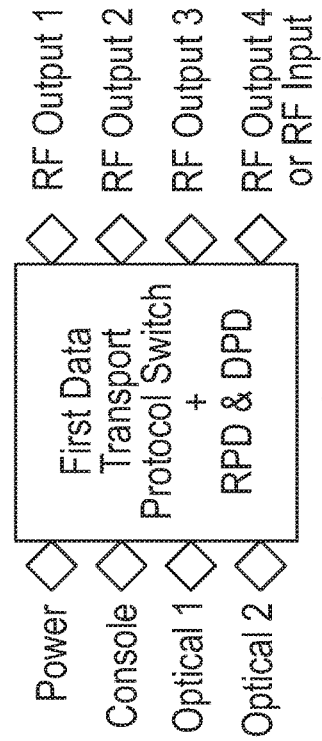
FIG. 3 is a block diagram of a trunking node.

FIG. 3 is a block diagram of trunking node 300 consistent with embodiments of the disclosure and as referenced above. Trunking node 300 may comprise a module that may fit in existing amplifier housings. There may be different versions of the module with different sized Field Programmable Gate Arrays (FPGAs)/Application-Specific Integrated Circuits (ASICs) to match different port and RPD configurations. When used for a parent node location (e.g., first node 106 of FIG. 1 or REN 204 of FIG. 2), there may be one primary optical input. An optional second optical input may be used for redundancy or daisy-chaining. As shown in FIG. 3, the module may include, for example, four RF Ethernet ports. This may work for a node with optical in and four RF Ethernet out or for an amplifier with one in and two or three out. The RF input and RF outputs may comprise a downstream path and an upstream path on separate connectors (i.e., separate connectors on the module, but a common connector on the node/amp). Digital Pre-Distortion (DPD) may be used in trunking node 300 to lower node/amp power for example.

Figure 4:
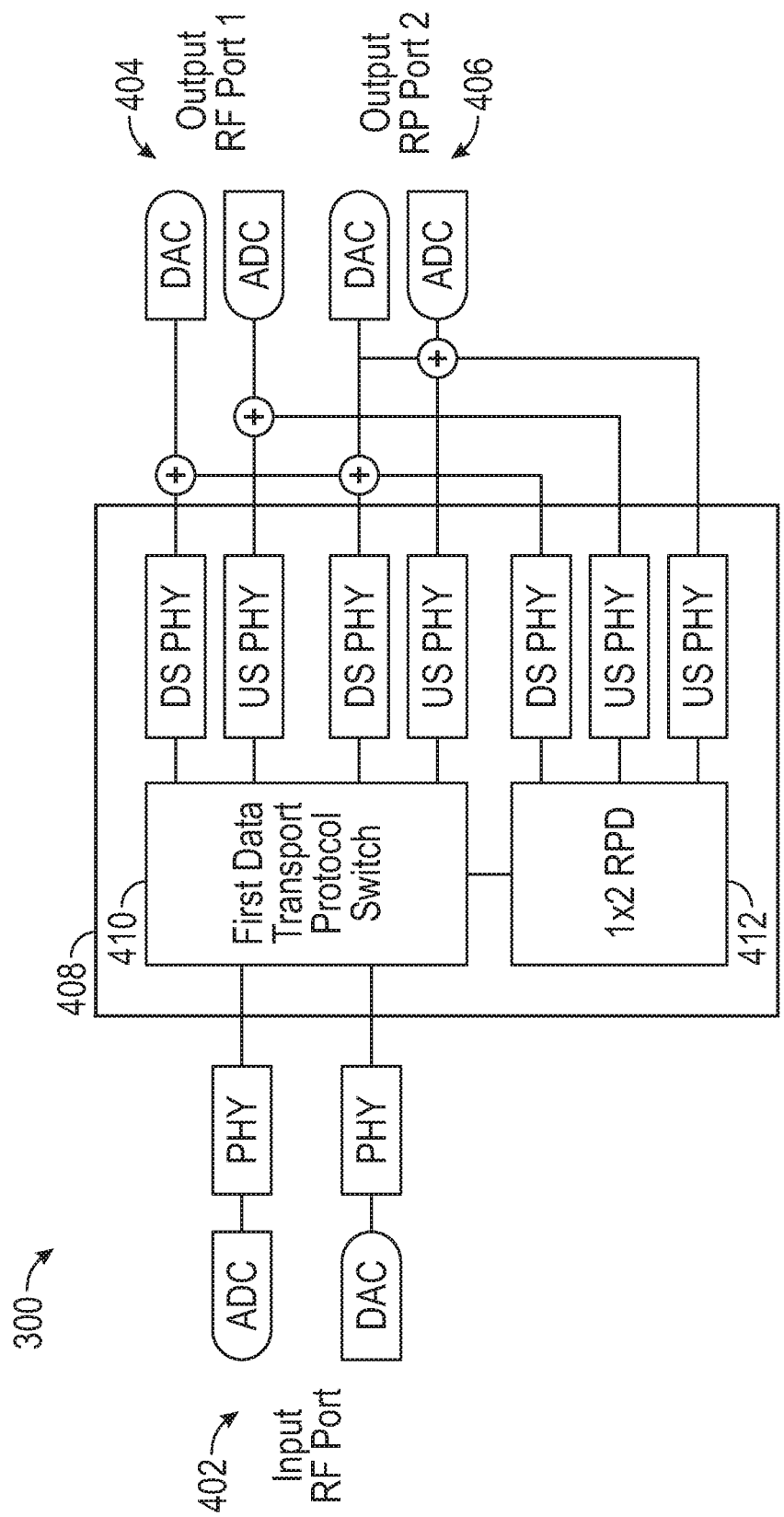
FIG. 4 is a block diagram of a trunking node.

FIG. 4 is a block diagram of trunking node 300 consistent with embodiments of the disclosure and as referenced above. FIG. 4 shown a version of trunking node 300 having one input, two outputs, and a 1×2 RPD. Trunking node 300 may have any number of outputs and is not limited to two. In the configuration shown in FIG. 4, trunking node 300 may be deployed as second node 108, third node 110, fourth node 112, fifth node 114, or sixth node 116 as shown in FIG. 1 or as any of plurality of REAs 206 shown in FIG. 2. Trunking node 300 may be configured with an optical input port rather than or in addition to a radio frequency input port and deployed as first node 106 of FIG. 1 or as REN 204 of FIG. 2. Trunking node 300 may support FDX DOCSIS, Digital-Pre-Distortion (DPD), FDX for RF Ethernet, and Mobile HetNet.

As shown in FIG. 4, trunking node 300 may comprise an input port 402, a first radio frequency output port 404, a second radio frequency output port 406, and a communication component 408. Communication component 408 may comprise a first data transport protocol switch 410 and a Remote PHY device (RPD) 412. First data transport protocol switch 410 may comprise an Ethernet switch. First data transport protocol switch 410 and RPD 412 may have different port connectivity. For example, as shown in FIG. 4, RPD 412 may be shared while Ethernet ports (e.g., input port 402) may be unique. While RPD 412 is shown as 1×2, RPD 412 may be 1×1, 1×2, 1×3, 1×4 up to 4×4 for example. 1×1 may use less power and less gates. If discrete chips are used for PHY, combine/split may be in the analog domain. FIG. 4 illustrates the digital domain. DPD may be in both blocks (i.e., in first data transport protocol switch 410 and in (RPD) 412.

As shown in FIG. 4, first data transport protocol switch 410 may be connected to input port 402 and first radio frequency output port 404. First data transport protocol switch 410 may be configured to pass data in a data stream using the first data transport protocol to and from input port 402 and first radio frequency output port 404. RPD 412 may be connected to first data transport protocol switch 410 and second radio frequency output port 406. For the downstream path, RPD 412 may be configured to receive data from first data transport protocol switch 410, convert the data received from first data transport protocol switch 410 to the second data transport protocol, and transmit the data converted to the second data transport protocol out the second radio frequency output port 406. For the upstream path, RPD 412 may be configured to receive data from second radio frequency output port 406, convert the data received from second radio frequency output port 406 to the first data transport protocol, and transmit the data converted to the first data transport protocol to first data transport protocol switch 410. First data transport protocol switch 410 may inject the data converted to the first data transport protocol into the data stream. Accordingly, the RF Ethernet that may be running in the data stream may act as an overlay that feeds RPD 412. The data stream may be propagating in a P2P RF Ethernet trunk over coaxial cable between other trunking nodes similar to trunking node 300 as described above with respect to FIG. 1 and FIG. 2.

Elements comprising communication component 408 may include, for example, first data transport protocol switch 410 and RPD 412. Each of these elements may be embodied in hardware and/or in software (including firmware, resident software, micro-code, etc.) or in any other circuits or systems. For example, first data transport protocol switch 410 and RPD 412 may be practiced in an electrical circuit comprising discrete electronic elements, packaged or integrated electronic chips containing logic gates, a circuit utilizing a microprocessor, or on a single chip containing electronic elements or microprocessors. Furthermore, first data transport protocol switch 410 and RPD 412 may also be practiced using other technologies capable of performing logical operations such as, for example, AND, OR, and NOT, including but not limited to, mechanical, optical, fluidic, and quantum technologies. In addition, first data transport protocol switch 410 and RPD 412 may be practiced in a computing device 500 as described in greater detail below with respect to FIG. 5.

Figure 5:
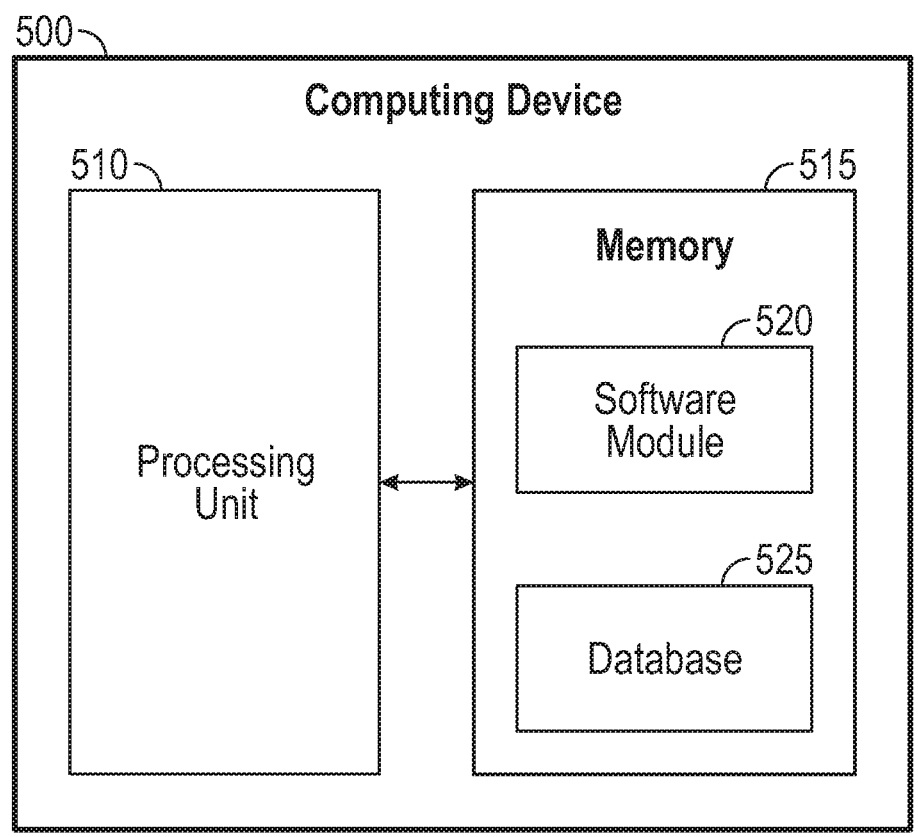
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing RF Ethernet trunking as described above. Computing device 500, for example, may provide an operating environment for first data transport protocol switch 410 and RPD 412. First data transport protocol switch 410 and RPD 412 may operate in other environments and are not limited to computing device 500.

Computing device 500 may be implemented using a personal computer, a network computer, a mainframe, a router, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A system comprising:
    a first data pathway between a headend and a first node, the first data pathway comprising a fiber optic channel using a first data transport protocol;
    a second data pathway between the first node and a second node, the second data pathway comprising a first coaxial cable channel using the first data transport protocol over a first radio frequency spectrum; and
    a third data pathway between the second node and a third node, the third data pathway comprising a second coaxial cable channel using the first data transport protocol over the first radio frequency spectrum, wherein the second data pathway and the third data pathway comprise a data trunk using the first data transport protocol for data to and from the first node.

2. The system of claim 1, wherein the first data transport protocol comprises Ethernet.

3. The system of claim 1, further comprising a fourth data pathway between the first node and a first customer premises equipment, the fourth data pathway comprising a third coaxial cable channel using a second data transport protocol over a second radio frequency spectrum.

4. The system of claim 3, wherein the second data transport protocol comprises Data Over Cable Service Interface Specification (DOCSIS).

5. The system of claim 1, further comprising a fifth data pathway between the second node and a second customer premises equipment, the fifth data pathway comprising a fourth coaxial cable channel using a second data transport protocol over a second radio frequency spectrum.

6. The system of claim 5, wherein the second data transport protocol comprises Data Over Cable Service Interface Specification (DOCSIS).

7. The system of claim 1, further comprising a sixth data pathway between the third node and a third customer premises equipment, the sixth data pathway comprising a fifth coaxial cable channel using a second data transport protocol over a second radio frequency spectrum.

8. The system of claim 7, wherein the second data transport protocol comprises Data Over Cable Service Interface Specification (DOCSIS).

9. An apparatus comprising:
an input port;
a first radio frequency output port;
a second radio frequency output port;
a first data transport protocol switch connected to the input port and the first radio frequency output port, wherein the first data transport protocol switch is configured to pass data in a data stream using a first data transport protocol to and from the input port and the first radio frequency output port; and
a Remote PHY device (RPD) connected to the first data transport protocol switch and the second radio frequency output port, wherein the RPD is configured to:
receive data from the first data transport protocol switch,
convert the data received from the first data transport protocol switch to a second data transport protocol,
transmit the data converted to the second data transport protocol out the second radio frequency output port,
receive data from the second radio frequency output port,
convert the data received from the second radio frequency output port to the first data transport protocol, and
transmit the data converted to the first data transport protocol to the first data transport protocol switch where the data converted to the first data transport protocol is injected into the data stream.

10. The apparatus of claim 9, wherein the input port comprises one of the following: a radio frequency input port and an optical input port.

11. The apparatus of claim 9, wherein the first data transport protocol comprises Ethernet.

12. The apparatus of claim 9, wherein the second data transport protocol comprises Data Over Cable Service Interface Specification (DOCSIS).

13. The apparatus of claim 9, wherein the data passed in the first data stream is passed in a Full Duplex mode.

14. The apparatus of claim 9, wherein the RPD is a Full Duplex RPD.

15. An apparatus comprising:
an input port;
a first radio frequency output port;
a second radio frequency output port; and
a communication component connected to the input port, the first radio frequency output port, and the second radio frequency output port, wherein the communication component is configured to:
pass data in a data stream using a first data transport protocol to and from the input port and the first radio frequency output port,
receive data from the first data stream,
convert the data received from first data stream to a second data transport protocol,
transmit the data converted to the second data transport protocol out the second radio frequency output port,
receive data from the second radio frequency output port,
convert the data received from the second radio frequency output port to the first data transport protocol, and
inject the data converted to the first data transport protocol into the data stream.

16. The apparatus of claim 15, wherein the input port comprises one of the following: a radio frequency input port and an optical input port.

17. The apparatus of claim 15, wherein the first data transport protocol comprises Ethernet.

18. The apparatus of claim 15, wherein the second data transport protocol comprises Data Over Cable Service Interface Specification (DOCSIS).

19. The apparatus of claim 15, wherein the data passed in the first data stream is passed using in a full duplex mode.

20. The apparatus of claim 15, wherein the apparatus is disposed in a Hybrid Fiber-Coaxial (HFC) network.

* * * * *